United States Patent [19]
Amini et al.

[11] Patent Number: 5,313,627
[45] Date of Patent: May 17, 1994

[54] PARITY ERROR DETECTION AND RECOVERY

[75] Inventors: Nader Amini; Bechara F. Boury; Sherwood Brannon, all of Boca Raton; Richard L. Horne, Boynton Beach, all of Fla.

[73] Assignee: International Business Machines Corp., Armonk, N.Y.

[21] Appl. No.: 816,184

[22] Filed: Jan. 2, 1992

[51] Int. Cl.[5] .............................................. G06F 11/00
[52] U.S. Cl. ..................................... 395/575; 371/49.1
[58] Field of Search ............... 395/575, 725, 325, 425; 371/49.1, 51.1, 29.5, 40.1

[56] References Cited
U.S. PATENT DOCUMENTS 3,806,716 4/1974 Lahti et al. .
4,858,234 8/1989 Hartwell et al. ...................... 371/14
5,072,450 12/1991 Helm et al. ......................... 371/51.1
5,173,905 12/1992 Parkinson et al. .................. 371/51.1
5,235,694 8/1993 Umeda ................................. 395/425
5,247,671 9/1993 Adkins et al. ....................... 395/725

Primary Examiner—Robert W. Beausoliel, Jr.
Assistant Examiner—Albert Decady
Attorney, Agent, or Firm—Robert S. Babayi

[57] ABSTRACT

In a computer system having a CPU and several buses which includes a system bus and an I/O bus, parity error can occur when data is being written between the I/O bus and the system bus. This invention provides a technique for detecting whether a parity error has occurred on data being written between the system bus and the I/O bus. If a parity error is detected, the address at which such error occurred is stored and then sent on to the system bus to the CPU.

12 Claims, 7 Drawing Sheets

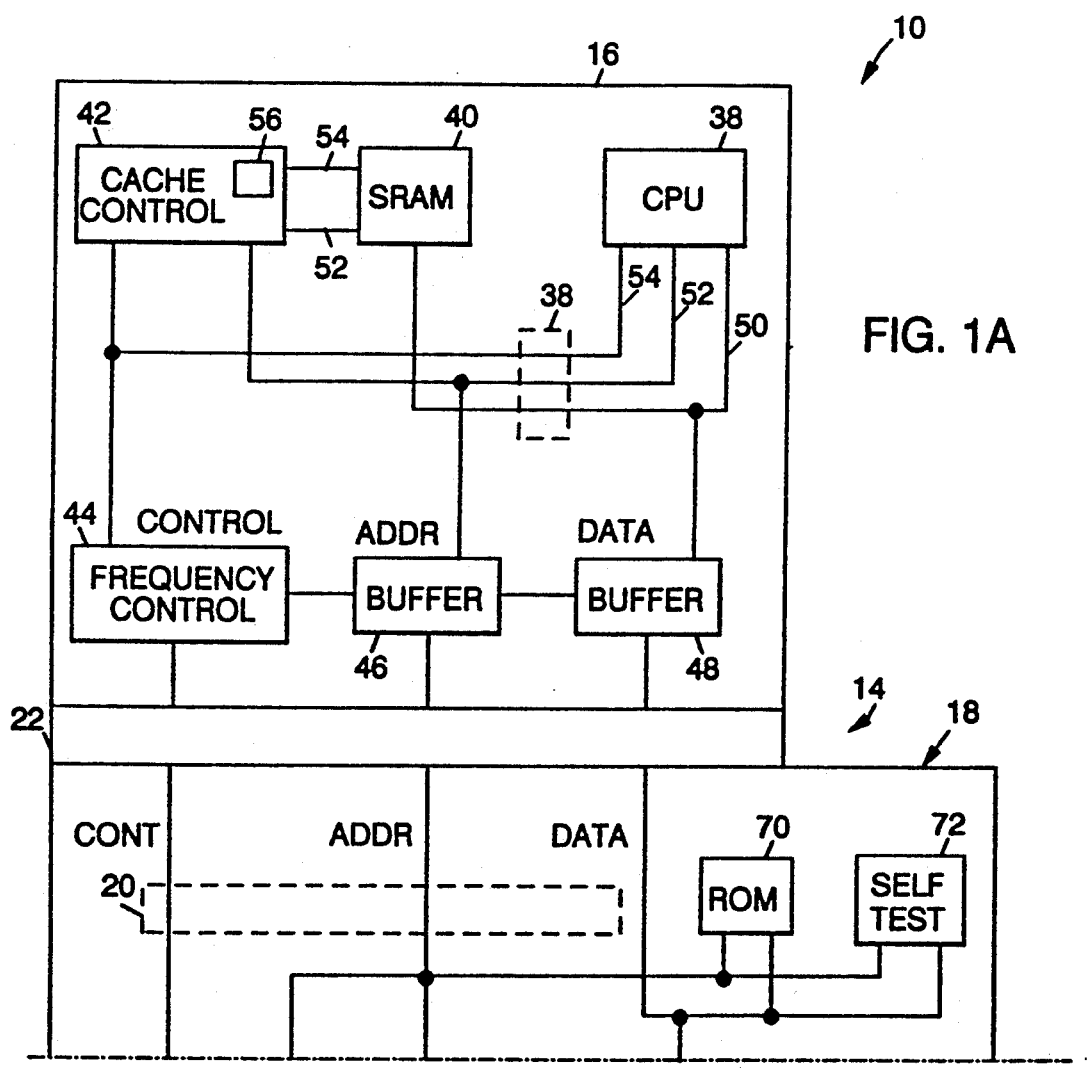

PARITY ERROR DETECTION AND RECOVERY

RELATED APPLICATIONS

The following United States patent applications are incorporated herein by reference as if they had been fully set out:

application Ser. No. 07/815,992 Filed Jan. 1, 1992 Entitled "BUS CONTROL LOGIC FOR COMPUTER SYSTEM HAVING DUAL BUS ARCHITECTURE"

application Ser. No. 07/816,116 Filed Jan. 1, 1992 Entitled "ARBITRATION MECHANISM" which is now U.S. Pat. No. 5,265,211.

application Ser. No. 07/816,204 Filed Jan. 1, 1992 Entitled "CACHE SNOOPING AND DATA INVALIDATION TECHNIQUE"

application Ser. No. 07/816,203 Filed Jan. 1, 1992 Entitled "BUS INTERFACE LOGIC FOR COMPUTER SYSTEM HAVING DUAL BUS ARCHITECTURE" which is now U.S. Pat. No. 5,255,374 application Ser. No. 07/816,691 Filed Jan. 1, 1992 Entitled "BIDIRECTIONAL DATA STORAGE FACILITY FOR BUS INTERFACE UNIT"

application Ser. No. 07/816,693 Filed Jan. 1, 1992 Entitled "BUS INTERFACE FOR CONTROLLING SPEED OF BUS OPERATION"

application Ser. No. 07/816,698 Filed Jan. 1, 1992 Entitled "METHOD AND APPARATUS FOR DETERMINING ADDRESS LOCATION AT BUS TO BUS INTERFACE"

FIELD OF THE INVENTION

The present invention relates to parity error recovery in a computer system, and more particularly to a technique for detecting the address at which a parity error has occurred on data being written to or from memory in a device coupled to an I/O bus, and writing the address to a system bus to which a CPU is coupled.

BACKGROUND OF THE INVENTION

Generally in computer systems and especially in personal computer systems, data is transferred between various system devices such as a central processing unit (CPU), memory devices, and direct memory access (DMA) controllers. In addition, data is transferred between expansion elements such as input/output (I/O) devices, and between these I/O devices and the various system devices. The I/O devices and the system devices communicate with and amongst each other over computer buses, which comprise a series of conductors along which information is transmitted from any of several sources to any of several destinations. Many of the system devices and the I/O devices are capable of serving as bus controllers (i.e., devices which can control the computer system) and bus slaves (i.e., elements which are controlled by bus controllers).

Personal computer systems having more than one bus are known. Typically, a local bus is provided over which the CPU communicates with cache memory or a memory controller, and a system I/O bus is provided over which system bus devices such as the DMA controller, or the I/O devices, communicate with the system memory via the memory controller. The system I/O bus comprises a system bus and an I/O bus connected by a bus interface unit. The I/O devices communicate with one another over the I/O bus. The I/O devices are also typically required to communicate with system bus devices such as system memory. Such communications must travel over both the I/O bus and the system bus through the bus interface unit.

In the case of reading and writing data between different buses, and particularly in the case when an I/O bus master device is writing data to or reading data from system memory, parity errors can occur. It is essential that these errors be identified to the CPU or other device so that appropriate action can be taken.

Accordingly, it is an object of this invention to provide a parity error recovery system which will detect and flag parity errors occurring during a read from or write to system memory by a device coupled to the I/O bus which is acting as a bus master in control of the I/O bus. Also, to capture the address at which the error occurred and to make it available to the system for appropriate action.

SUMMARY OF THE INVENTION

According to the present invention a computer system is provided which includes a CPU complex, system memory and a plurality of devices communicating with the CPU complex and system memory through a system bus. At least one of the devices communicates through a bus to bus interface unit. The interface unit includes means to detect a parity error in data being transmitted, means to store the address of the data containing the parity error and means to write the address of the parity error on the system bus. In more particular aspects, the invention also includes means to latch the stored address of the data containing the parity error until it has been read by a system bus device.

BRIEF DESCRIPTION OF THE DRAWINGS

FIG. 1A, 1B is a schematic block diagram of a computer system incorporating a bus interface unit constructed according to the principles of the present invention.

DETAILED DESCRIPTION OF THE PREFERRED EMBODIMENT

Figure 1B:
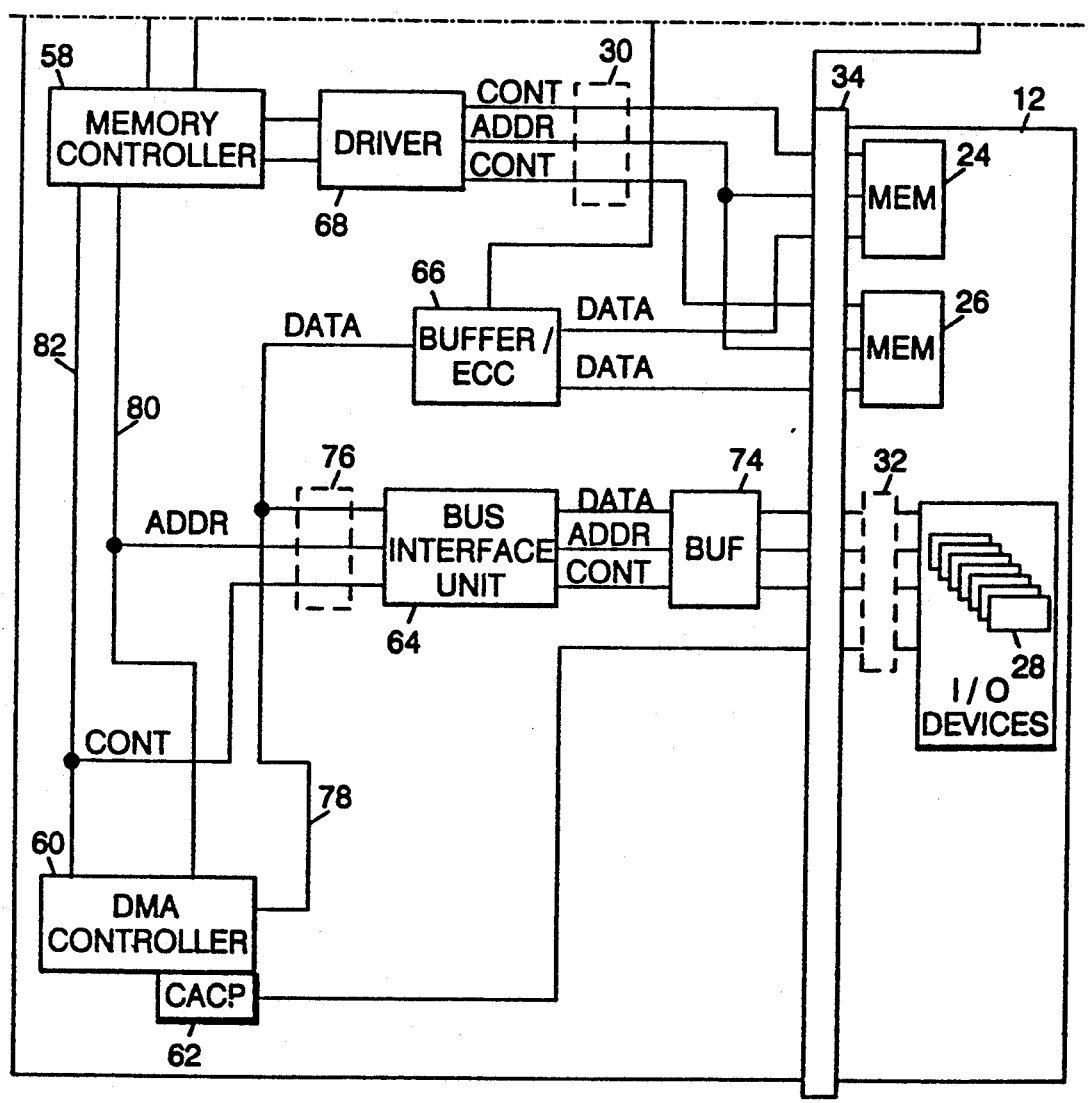

Referring first to FIG. 1, a computer system shown generally at 10 comprises system board 12 and processor complex 14. Processor complex includes processor portion 16 and base portion 18 connected at processor local bus 20 via local bus connector 22. Processor portion 16 operates at 50 MHz and base portion 18 operates at 40 MHz.

System board 12 includes interleaved system memories 24 and 26 and input/output (I/O) devices 28. Communications between memories 24 and 26 and processor complex 14 are handled by memory bus 30, and communications between I/O devices 28 and processor complex 14 are carried by I/O bus 32. Communications between I/O devices and memories 24 and 26 are handled by I/O bus 32, system bus 76 and memory bus 30. I/O bus 32 may conform to MICRO CHANNEL ® computer architecture. Memory bus 30 and I/O bus 32 are connected to processor complex base portion 18 via processor complex connector 34. I/O devices such as memory expansion devices may be connected to the computer system 10 via I/O bus 32. System board 12 may also include conventional video circuitry, timing circuitry, keyboard control circuitry and interrupt circuitry (none of which are shown) which may be used by computer system 10 during normal operation.

Processor portion 16 of processor complex 14 includes central processing unit (CPU) 38 which, in the preferred embodiment, is a 32-bit microprocessor available from Intel, Inc. under the trade designation i486. Processor portion 16 also includes static random access memory (SRAM) 40, cache control module 42, frequency control module 44, address buffer 46 and data buffer 48. Local bus 20 comprises data information path 50, address information path 52 and control information path 54. Data information paths 50 are provided between CPU 38, SRAM 40 and data buffer 48. Address information paths 52 are provided between CPU 38, cache control module 42 and address buffer 46. Control information paths 54 are provided between CPU 38, cache control module 42 and frequency control module 44. Additionally, address and control information paths are provided between cache control module 42 and SRAM 40.

SRAM 40 provides a cache function by storing in short term memory information from either system memories 24 or 26 or from expansion memory which is located on an I/O device 28. Cache control module 42 incorporates random access memory (RAM) 56 which stores address locations of memories 24 and 26. CPU 38 may access information cached in SRAM 40 directly over the local bus 20. Frequency control module 44 synchronizes operation of the 50 Mhz processor portion 16 with the 40 MhZ base portion 18 and also controls the operation of buffers 46 and 48. Accordingly, frequency control module 44 determines the times at which information is captured by buffers 46 and 48 or the times at which information that is stored in these buffers is overwritten. Buffers 46 and 48 are configured to allow two writes from memories 24 and 26 to be stored simultaneously therein. Buffers 46 and 48 are bi-directional, i.e., they are capable of latching information which is provided by the CPU 38 and information which is provided to the CPU. Because buffers 46 and 48 are bi-directional, processor portion 16 of the processor complex 14 may be replaced or upgraded while maintaining a standard base portion 18.

Base portion 18 includes memory controller 58, direct memory access (DMA) controller 60, central arbitration control point (CACP) circuit 62, bus interface unit 64 and buffer/error correction code (ECC) circuit 66. Base portion 18 also includes driver circuit 68, read only memory (ROM) 70, self test circuit 72 and buffer 74. System bus 76 comprises a data information path 78, and address information path 80 and a control information path 82. The data information path connects buffer 74 with bus interface unit 64; bus interface unit 64 with DMA controller 60 and buffer/ECC circuit 66; and buffer/ECC circuit 66 with system memories 24 and 26. The address information path and the control information path each connect memory controller 58 with DMA controller 60 and bus interface unit 64; and bus interface unit 64 with buffer 74.

Memory controller 58 resides on both CPU local bus 20 and system bus 76, and provides the CPU 38, the DMA controller 60 or bus interface unit 64 (on behalf of an I/O device 28) with access to system memories 24 and 26 via memory bus 30. The memory controller 58 initiates system memory cycles to system memories 24 and 26 over the memory bus 30. During a system memory cycle, either the CPU 38, the DMA controller 60 or bus interface unit 64 (on behalf of an I/O device 28) has access to system memories 24 and 26 via memory controller 58. The CPU 38 communicates to system memory via local bus 20, memory controller 58 and memory bus 30, while the DMA controller 60 or bus interface unit 64 (on behalf of an I/O device 28) access system memory via system bus 76, memory controller 58 and memory bus 30.

For CPU 38 to I/O bus 32 read or write cycles, address information is checked against system memory address boundaries. If the address information corresponds to an I/O expansion memory address or I/O port address, then memory controller 58 initiates an I/O memory cycle or I/O port cycle with an I/O device 28 (via bus interface unit 64) over the I/O bus 32. During a CPU to I/O memory cycle or I/O port cycle, the address which is provided to memory controller 58 is transmitted from system bus 76 to I/O bus 32 via bus interface unit 64 which resides intermediate these two buses. The I/O device 28 which includes the expansion memory to which the address corresponds receives the memory address from I/O bus 32. DMA controller 60 and the bus interface unit 64 control the interchange of information between system memories 24 and 26 and expansion memory which is incorporated into an I/O device 28. DMA controller 60 also provides three functions on behalf of processor complex 14. First, the DMA controller 60 utilizes a small computer subsystem control block (SCB) architecture to configure DME channels, thus avoiding the necessity of using programmed I/O to configure the DMA channels. Second, DMA controller provides a buffering function to optimize transfers between slow memory expansion devices and the typically faster system memory. Third, DMA controller 60 provides an eight channel, 32-bit, direct system memory access function. When providing the direct system memory access function, DMA controller 60 may function in either of two modes. In a first mode, DMA controller 60 functions in a programmed I/O mode in which the DMA controller is functionally a slave to the CPU 38. In a second mode, DMA controller 60 itself functions as a system bus master, in which DMA controller 60 arbitrates for and controls I/O bus 32. During this second mode, DMA controller 60 uses a first in, first out (FIFO) register circuit.

CACP circuit 62 functions as the arbiter for the DMA controller, I/O device bus controllers and the CPU (if accessing I/O devices). CACP circuit 62 receives arbitration control signals from DMA controller 60, memory controller 58 as well as from I/O devices, and determines which devices may control the I/O bus 32 and the length of time during which the particular device will retain control of the I/O bus.

Driver circuit 68 provides control information and address information from memory controller 58 to system memories 24 and 26. Driver circuit 68 drives this information based upon the number of single in-line memory modules (SIMMs) which are used to construct system memories 24 and 26. Thus, driver circuit 68 varies the signal intensity of the control and address information which is provided to system memories 24 and 26 based upon the size of these memories.

Buffer circuit 74 provides amplification and isolation between processor complex base portion 18 and system board 12. Buffer circuit 74 utilizes buffers which permit the capture of boundary information between I/O bus 32 and bus interface unit 64 in real time. Accordingly, if computer system 10 experiences a failure condition, buffer circuit 74 may be accessed by a computer repair person to determine the information which was present at connector 34 upon failure of the system.

ROM 70 configures the system 10 upon power-up by initially placing in system memory data from expansion memory. Self test circuit 72, which is connected to a plurality of locations within base portion 18, provides a plurality of self test features. Self test circuit 72 accesses buffer circuit 74 to determine if failure conditions exist, and also tests the other major components of base portion 18 upon power-up of the system 10 to determine whether the system is ready for operation.

Figures 2, 2A:
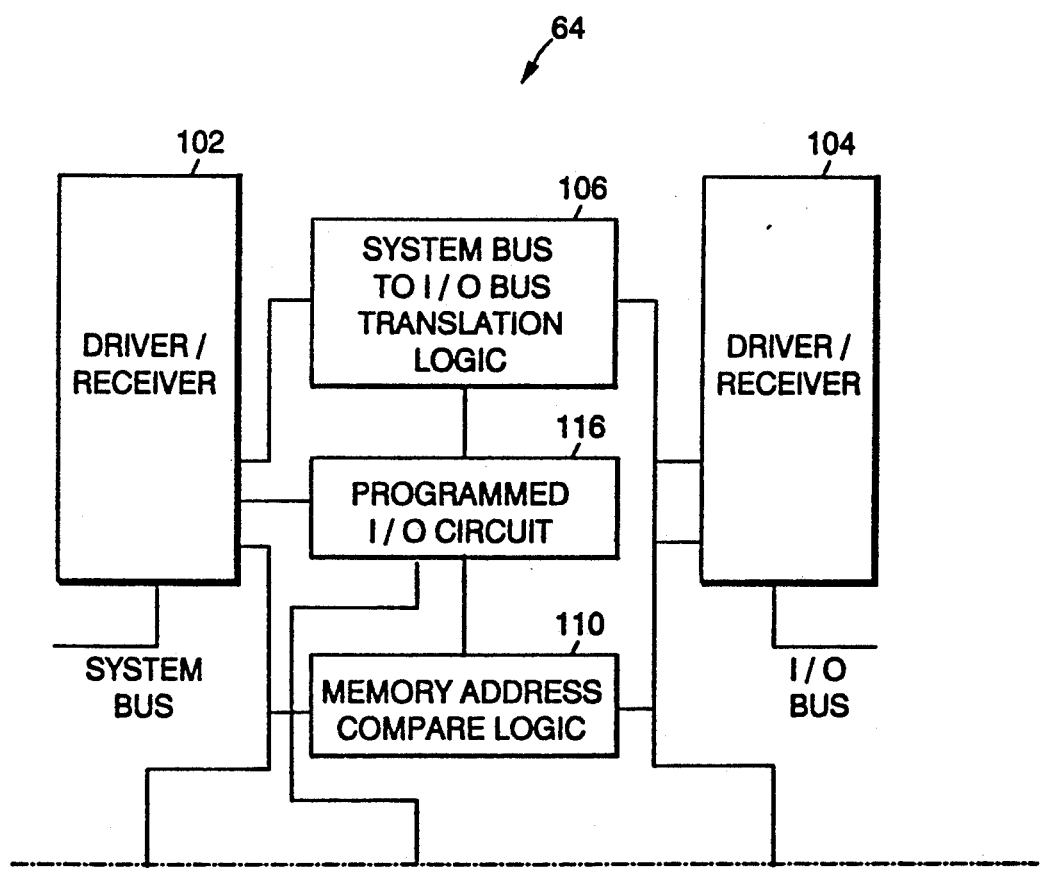
FIG. 2A, 2B is a schematic block diagram of the bus interface unit of the computer system of FIG. 1.
Figure 2B:
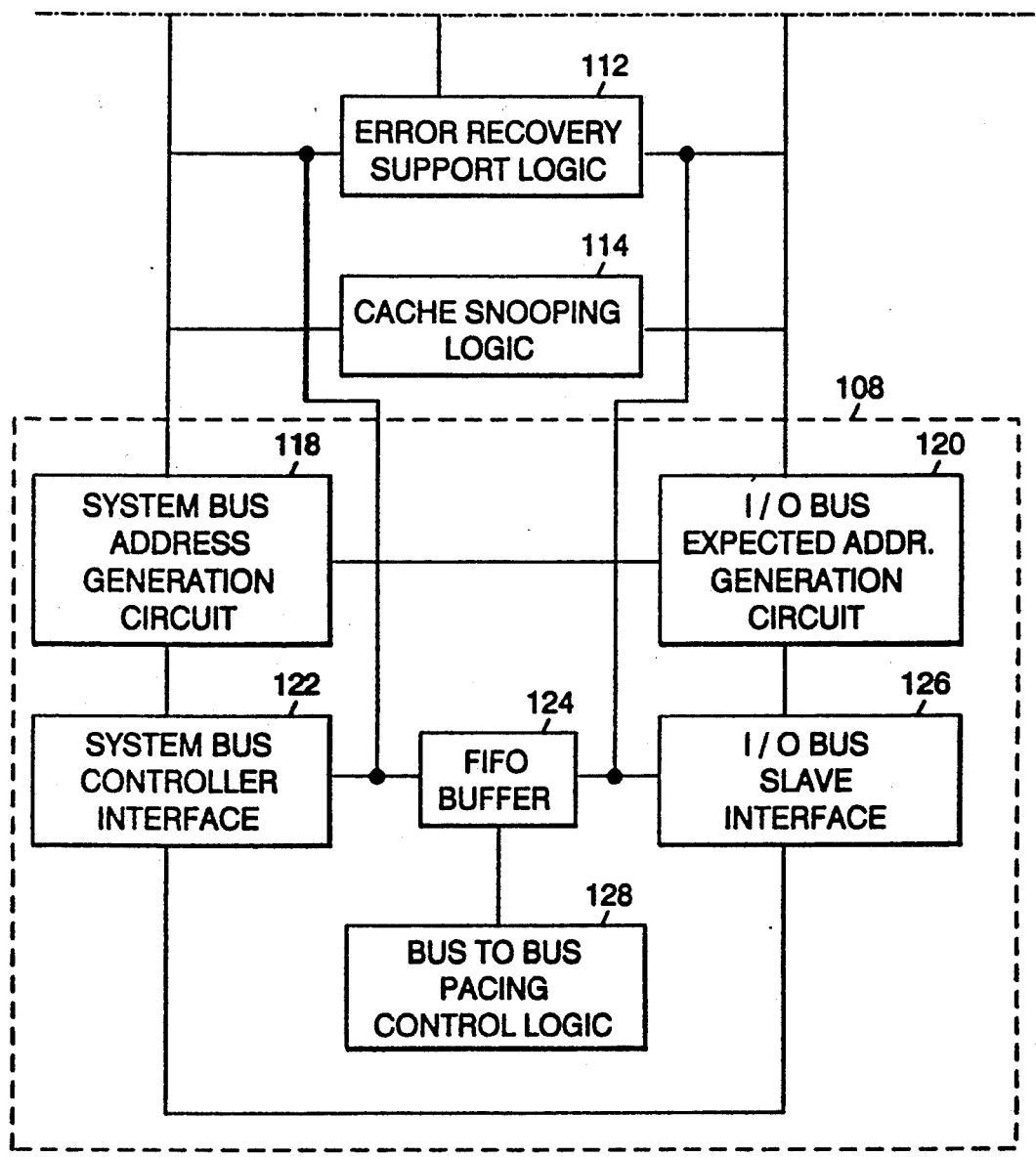

Referring to FIG. 2, a schematic block diagram of the bus interface unit 64 of the system of FIG. 1 is shown. Bus interface unit 64 provides the basis for implementation of the present invention by providing a bi-directional high speed interface between system bus 76 and I/O bus 32.

Bus interface unit 64 includes system bus driver/receiver circuit 102, I/O bus driver/receiver circuit 104 and control logic circuits electrically connected therebetween. Driver/receiver circuit 102 includes steering logic which directs signals received from the system bus 76 to the appropriate bus interface unit control logic circuit and receives signals from the bus interface unit control logic circuits and directs the signals to the system bus 76. I/O bus driver/receiver circuit 104 includes steering logic which directs signals received from the I/O bus 32 to the appropriate bus interface unit control logic circuit and receives signals from the bus interface unit control logic circuits and directs the signals to the I/O bus 32.

The bus interface unit control logic circuits include system bus to I/O bus translation logic 106, I/O bus to system bus translation logic 108, memory address compare logic 110, error recovery support logic 112, and cache snooping logic 114. Programmed I/O circuit 116 is also electrically coupled to system driver/receiver circuit 102.

The system bus to I/O bus translation logic 106 provides the means required for the DMA controller 60 or the memory controller 58 (on behalf of CPU 38) to act as a system bus controller to access the I/O bus 32 and thereby communicate with I/O devices 28 acting as slave devices on the I/O bus. Translation logic 106 translates the control, address and data lines of the system bus 76 into similar lines on the I/O bus 32. Most control signals and all address signals flow from the system bus 76 to the I/O bus 32 while data information flow is bi-directional. The logic which acts as system bus slave monitors the system bus 76 and detects cycles which are intended for the I/O bus 32. Upon detection of such a cycle, the system bus slave translates the timing of signals on the system bus to I/O bus timing, initiates the cycle on the I/O bus 32, waits for the cycle to be completed, and terminates the cycle on the system bus 76.

The I/O bus to system bus translation logic 108 comprises system bus address generation circuit 118, I/O bus expected address generation circuit 120, system bus controller interface 122, FIFO buffer 124, I/O bus slave interface 126 and bus to bus pacing control logic 128. System bus controller interface 122 supports a high performance 32 bit (4 byte) i486 burst protocol operating at 40 MHZ. Data transfers of four, eight and sixteen bytes in burst mode and one to four bytes in no-burst mode are provided. I/O bus slave interface 126 monitors the I/O bus 32 for operations destined for slave devices on the system bus 76 and ignores those operations destined for the I/O bus 32. All cycles picked up by the I/O bus slave interface 126 are passed on to the FIFO buffer 124 and the system bus controller interface 122.

The I/O bus to system bus translation logic 108 provides the means required for an I/O device 28 to act as an I/O bus controller to access system bus 76 and thereby read or write to system memories 24 and 26. In either of these operations, an I/O device controls the I/O bus. The asynchronous I/O bus interface 126, operating at the speed of the I/O device, permits the bus interface unit 64 to act as a slave to the I/O device controller on the I/O bus 32 to decode the memory address and determine that the read or write cycle is destined for system memories 24 or 26. Simultaneously, the system bus controller interface 122 permits the bus interface unit 64 to act as a controller on the system bus 74. The memory controller 58 (FIG. 2) acts as a slave to the bus interface unit 64, and either provides the interface 64 with data read from system memory or writes data to system memory. The reads and writes to system memory are accomplished through the FIFO buffer 124, a block diagram of which is illustrated in FIG. 3.

Figure 3:
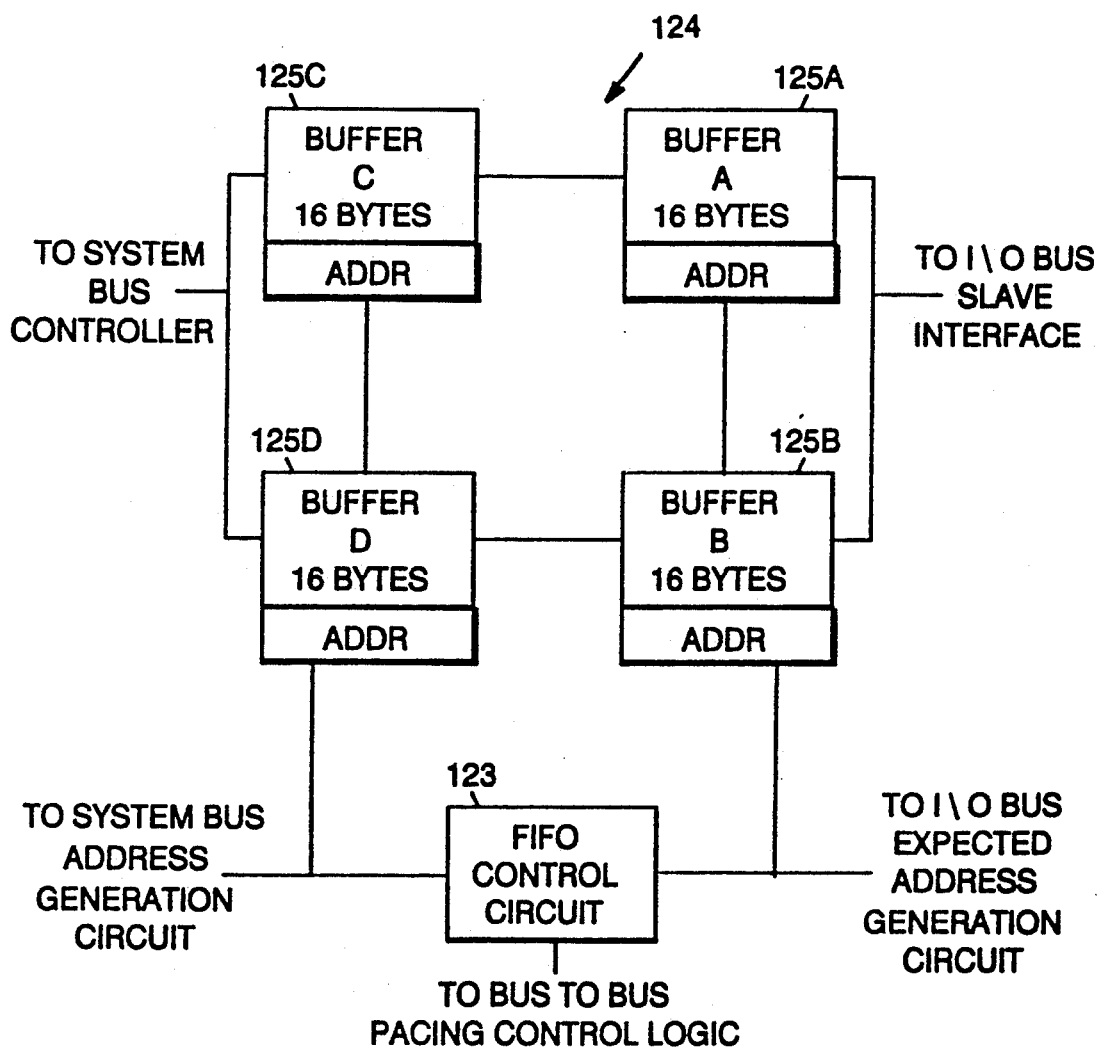
FIG. 3 is a schematic block diagram of the FIFO buffer of the bus interface unit of FIG. 2.

As shown in FIG. 3, FIFO buffer 124 is a dual ported, asynchronous, bi-directional storage unit which provides temporary storage of data information between the system and I/O buses 76, 32. FIFO buffer 124 comprises four sixteen-byte buffers 125A-125D and FIFO control circuit 123. The four buffers 125A-125D buffer data to and from I/O bus controllers and system bus slaves, thereby allowing simultaneous operation of the I/O bus 32 and the system bus 76. The FIFO buffer 124 is physically organized as two thirty-two byte buffers (125A/125B and 125C/125D). The system bus controller interface 122 and the I/O bus slave interface 126 each control one thirty-two byte buffer while the other thirty-two byte buffer operates transparent to them. Both of the thirty-two byte buffers are utilized for read and write operations.

Each FIFO 124A, 125B, 125C, 125D has an address register section either physically associated with the respective FIFO, or logically associated therewith. As data is transferred from the I/O bus 32 to FIFO 125A, the data will be accumulated until the 16 byte buffer is filled with 16 bytes of data, provided that the addresses are contiguous. If a non-contiguous address is detected by the address action, the FIFO 125A will transfer the stored data to FIFO 125C, and at the same time FIFO 125B will start to receive this data from the new non-contiguous address. FIFO 125B will continue just as FIFO 125A did until it is filled with 16 bytes of data, or another non-contiguous address is detected. FIFO 125B will then transfer the stored data to FIFO 125D, and FIFO 125A again starts to store data; thus, it is possible to store up to four 16 byte blocks of non-contiguous address data.

Further, by having two 32 byte buffers in parallel the reading and writing of data can be toggled between them thus giving an essentially continuous read or write function.

Moreover, by splitting the 32 byte buffers into two 16 bytes buffer sections which are coupled to other I/O bus 32 or system bus 26, the number of storage buffers can be increased with minimal impact on the performance of the FIFO as related to the capacitive loading on signals clocking data in or out of the storage registers. This is accomplished because for every two buffers added (in parallel) only half the capacitive loading is added to the loading of clock signals on each bus.

Additionally, by having two 16 byte buffers in series in each leg, once one of the 16 byte buffers is filled with data, such as in a read operation, the data can be transferred to the other 16 byte buffers in series therewith, while the other parallel leg is accumulating data. Hence, there is no time lost in either accumulating data, or transferring the data from one bus to the other.

The logic for controlling the operation of the FIFO 124 is supplied by FIFO Control Circuit 123.

A particular I/O device 28 may write to system memories 24 or 26 via I/O bus in bandwidths of either 1, 2 or 4 bytes (i.e., 8, 16 or 32 bits). During writes to system memory by an I/O device 28, the first transfer of write data is initially stored in the FIFO buffer 125A or 125B. The I/O bus expected address generation circuit 120 calculates the next expected, or contiguous, address. The next contiguous address is checked against the subsequent I/O address to verify if the subsequent transfers are contiguous or not. If contiguous, the second byte or bytes of write data is sent to the same FIFO buffer 125A or 125B. The FIFO receives data at asynchronous speeds of up to 40 megabytes per second from the I/O bus 32.

This process continues until either buffer 125A or 125B is full with a 16-byte packet of information or a non-contiguous address is detected. On the next clock cycle, assuming that buffer 125A is full, the data in buffer 125A is transferred to buffer 125C. Similarly, when buffer 125B is full, all of its contents are transferred to buffer 125D in a single clock cycle. The data stored in the buffers 125C and 125D is then written to system memory via an i486 burst transfer at the system bus operational speed. The operation of FIFO buffer 124 during a write to system memory by an I/O device is thus continuous, alternating between buffers 125A and 125B, with each emptying into adjacent buffer 125C or 125D, respectively, while the other is receiving data to be written to system memory. The FIFO buffer 124, then, optimizes the speed of data writes to system memory by (i) anticipating the address of the next likely byte of data to be written into memory and (ii) accommodating the maximum speed of write data from the FIFO buffer to system memory via the system bus 76.

During reads of data from system memory to an I/O device 28, FIFO buffer 124 operates differently. The system bus address generation circuit 118 uses the initial read address to generate subsequent read addresses of read data and accumulate data in buffer 125C or 125D. Because the system bus supports transfers in bandwidths of 16 bytes wide, the system bus controller interface 122 may prefetch 16-byte packets of contiguous data and store it in buffers 125C or 125D without the I/O bus 32 actually providing subsequent addresses, thus reducing latency between transfers. When buffer 125C is full of prefetched data, it transfers its contents to buffer 125A in one clock cycle. Buffer 125D similarly empties into buffer 125B when full. The data in buffers 125A and 125B may then be read by a particular I/O device controller in bandwidths of 1, 2 or 4 bytes. In this way, system bus address generation circuit 118 functions as an increment counter until instructed to by the I/O controller device to stop prefetching data.

Bus to bus pacing control logic 128 creates a faster access to system memory for high speed I/O devices. The bus to bus pacing control logic 128 overrides the normal memory controller arbitration scheme of system 10 by allowing an I/O device in control of the I/O bus 32 uninterrupted access to system memory during transfers of data by faster devices which require multiple cycles, rather than alternating access to the memory controller 58 between the I/O device and the CPU. Thus, even if a local device such as the CPU has a pending request for control of the memory bus during a multiple cycle transmission by an I/O device, the bus to bus pacing control logic 128 will grant the I/O device continued control of the memory bus.

The programmed I/O circuit 116 is the portion of the bus interface unit 64 which contains all of the registers which are programmable within the bus interface unit 64. The registers have bits associated therewith to determine whether a particular register is active or inactive. These registers define, inter alia, the system memory and expansion memory address ranges to which the bus interface unit 64 will respond, the expansion memory addresses which are either cacheable or noncacheable, the system memory or cache address ranges, and whether or not parity or error checking is supported by the bus interface unit. Accordingly, programmed I/O circuit 116 identifies for the bus interface unit 64 the environment in which it resides, and the options to which it is configured. The registers in programmed I/O circuit 116 cannot be programmed directly over the I/O bus 32. Hence, in order to program the system 10, the user must have access to an I/O device which may communicate over the system bus to the programmed I/O circuit 116 at the CPU level.

Memory address compare logic 110 determines if a memory address corresponds to system memory or corresponds to expansion memory which is located on I/O device 28 coupled to the I/O bus 32. Because the system memory as well as the expansion memory may be in non-contiguous blocks of addresses, memory address compare logic 110 includes a plurality of comparators which are loaded with boundary information from registers in the programmed I/O circuit 116 to indicate which boundaries correspond to which memory. After a particular memory address is compared with the boundary information by the memory address compare logic, the bus interface unit is prepared to react accordingly. For example, if an I/O device controlling the I/O bus 32 is reading or writing to expansion memory, the bus interface circuit need not pass that address to the memory controller 58, thereby saving time and memory bandwidth.

Error recovery support logic 112 permits the system 10 to continue operations even if a data parity error is detected. On any read or write access by an I/O device 28 to system memories 24 or 26, parity of the data is checked. Support logic 112 interacts with a register in the programmed I/O circuit 116 for capturing the address and the time of the detected parity error. The contents of this register may then be acted upon by appropriate system software. For example, the CPU 38 may be programmed for a high level interrupt to pull the address out of the register at any time a parity error is detected. The CPU may then decide, based on the system software instructions, whether to continue system operations or merely terminate operation of the identified source of the parity error.

Cache snooping logic 114 permits the bus interface unit 64 to monitor the I/O bus 32 for any writes to expansion memory by an I/O device taking place over the I/O bus 32. The snooping logic first determines if the write to expansion memory occurred in expansion memory which is cacheable in SRAM 40. If it is not cacheable expansion memory, there is no danger of corrupt data being cached. If, however, a positive compare indicates that the write occurred in cacheable expansion memory, a cache invalidation cycle is initiated over the system bus 76. The CPU is thus instructed to invalidate the corresponding address in SRAM 40. Cache snooping logic 114 provides means to store the address of a positive compare so that snooping of the I/O bus may continue immediately after detection of the first positive compare, thereby permitting continuous monitoring of the I/O bus 32.

Figure 4:
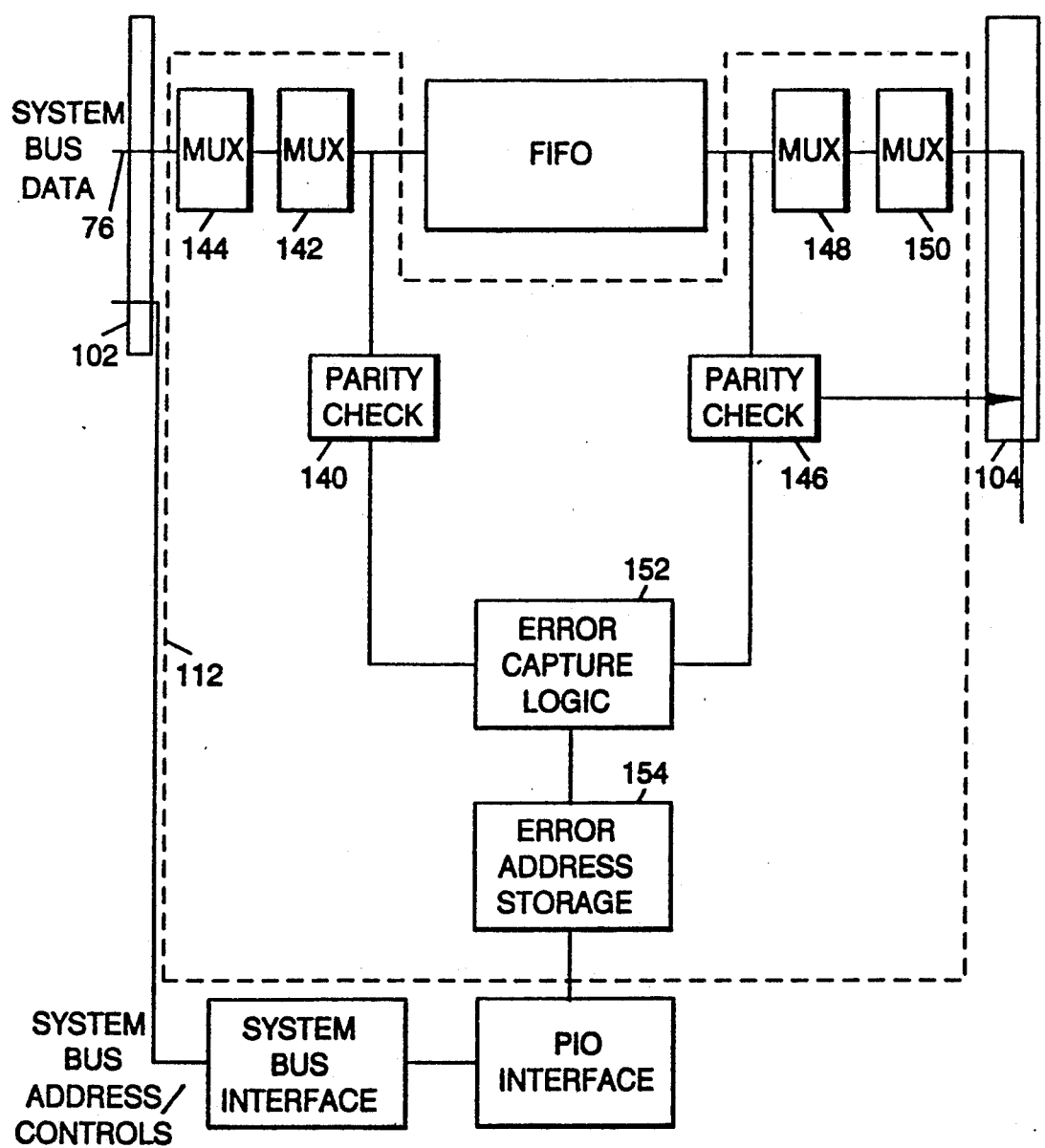
FIG. 4 is a block diagram of the logic used for the error memory support logic.

The error recovery support logic 112 is provided to detect if a parity error has occurred on data that is being either written to the system memory 24, 26 through the FIFO 124 from the I/O bus 32 or read from the system memory 24, 26 through the FIFO when a device coupled to the I/O bus 32 is in control of the I/O bus 32 as a bus master, and if there is a parity error detected, to capture the address of the location of the data containing the parity error and to write to or flag the system bus 76 that such an error has occurred. As is shown in FIG. 4, the error recovery support logic 112 includes parity check logic 140 coupled to the system bus 76 through multiplexers 142 and 144 and parity check logic 146 coupled to the channel bus 32 through multiplexers 148 and 150. The parity check logic can be any of various known logic schemes and thus need not be described in detail. The bus interface unit 64 generates a command for and checks for parity during alternate system bus master read and write cycles. If a parity error is detected by parity check logic 146 in data being written into the FIFO 124 from the I/O bus 32 or by parity check logic 140 in data being written into the FIFO 124 from system bus 76 (I/O device 28 memory read cycles), an error signal is generated in error capture logic 152 as an error flag. This will also generate a channel check signal on line 153 which will write a signal on the I/O bus 32 which will eventually be detected by the CPU 38 or some other device on the system bus.

At the same time that the error signal is generated the address at which the error occurred is stored in error address storage register 154. When the CPU 38 or other device detects the system check signal on the system bus 76, it will take control of the system bus 76 during the first arbitration cycle and check all the devices coupled to the system bus 76. This check will reveal that the error flag in the error capture logic 152 was set indicating that the error occurred during the operation of an I/O controller coupled to the I/O bus 32. The CPU 38 will also read the address of the error from the error address storage register 154. Once the address has been read by the CPU 38 the system bus 76 may be returned for normal arbitration.

The CPU 38 can then take whatever action or actions which are appropriate with regard to the address of the error which was stored. These actions are preprogrammed in the CPU complex 14. Thus, if a parity error has occurred in the data being written into or out of one of the devices on the I/O bus 32, the CPU or any other control device does not necessarily have to shut down the entire computer system and repower it, but it may well just isolate either one or all of the I/O devices and continue operation. This will allow for more efficient operation of the CPU in as much as it may continue operating even if a parity error has been detected on one of the devices coupled to the I/O bus without necessitating a system shut down and repowering of the entire computer system which can be costly and time consuming.

It should be noted that data containing the error is not corrected or rewritten but is merely passed on in its "corrupted" form. This error recovery support logic 112 does not contain any code for correcting the parity error but merely identifies that data containing a parity error has been written into the FIFO 124 and captures its address and makes the address available to the CPU or other device for correcting the error. Indeed, such other device could be some sort of error correction device which may attempt to correct the error before it is detected by the CPU 38 for appropriate action.

Figure 5:
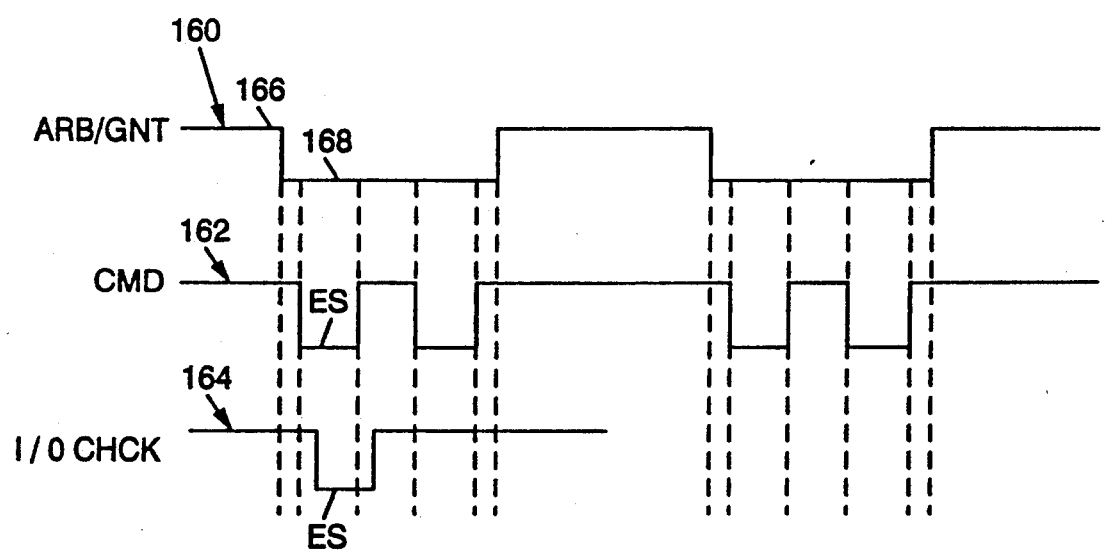
FIG. 5 is a timing diagram of the detection and writing of a parity error.

A timing diagram shown in FIG. 5 depicts an occurrence of a typical parity error and how it is flagged, its address stored, the error occurrence reported to the CPU and the address interrogated. As indicated above, the parity error check is initiated when a device coupled to the I/O bus 32 is a bus master on the I/O bus 32 and the system bus 76, and the bus interface unit 64 is the slave and there is either a system memory write cycle to a system memory 24 or 26 location a read cycle from system memory 24 or 26 by a device 28 coupled to the I/O bus 32.

In this diagram, a typical occurrence of a parity error and how it is flagged, how its address is stored and the occurrence of the error and the address thereof is reported to the CPU 38. Line 160 represents arbitration/grant cycles of the logic as described in application ser. no.07/816,116 filed Jan. 1, 1992, entitled "Bus Control Logic For Computer System Having Dual Bus Architecture", line 162 represents the command cycles to transfer data generated from an I/O bus master to provide necessary timing, and line 164 represents an I/O bus check cycle for error reporting generated by the bus interface unit 64. As shown on line 160, the system bus includes alternating arbitration cycles 166 and grant cycles 168. It is only on the grant cycles that a bus master may transfer data.

If during a grant cycle 168 a parity error occurs during any system memory 24 or 26 transfer, an error signal ES is generated and this signal is written on the I/O bus as an error check signal ECS indicating a parity error. This will raise a flag in the error capture logic 152 and store the address of the error in error address storage register 154 by generating the I/O error check signal ECS which is written on the signal line 153. The address of the error is latched into the error address storage register 154 until it is read out by the CPU 38. By flagging and latching the address of the first error to occur during a write operation, it is not necessary to flag or store any additional errors that may occur during this write cycle before the processor has taken control of the system bus 76. This is so since the CPU 38 will have the address location of where the first error occurred and any data transfers that take place after that can be discarded or otherwise treated as corrupted. However, it is necessary that this first error be latched to prevent it from being lost by any subsequent error, and the address of the original error being overwritten with the address of the subsequent error in the address rwgister 154. Thus, the latching of the first error identifies the location where an error has occurred without the necessity of identifying subsequent errors during that grant cycle.

At the conclusion of the grant cycle during which the error has been detected, the CPU 38 will take control of the system bus 76 and maintain control of the system bus 76 until the CPU 38 interrogates the error capture logic 152 to determine if the error occurred on a device coupled to the I/O bus, and if so it will interrogate the error address storage register 154 and take any necessary error recovery actions before returning the system to normal arbitration.

As described above since the address of the first detected parity error is latched by the error address storage register 154 this address location will be determined irrespective of whether additional errors are detected during the same grant cycle, and will be retained until the CPU 38 has read the address and released the system bus 76 for arbitration.

Although one embodiment of this invention has been shown and described, various adaptations and modifications can be made without departing from the scope of the invention as defined in the appended claims.

Having thus described the preferred embodiment, the invention is now claimed to be:

1. A dual-bus computer system, comprising:
   system memory and a central processing unit electrically interconnected by a system bus;
   a bus interface unit electrically interconnecting said system bus to an input/output bus, said input/output bus having at least one input/output device attached thereto, said input/output device able to initiate individual memory write or memory read cycles to and from said system memory, respectively, over said input/output bus, said bus interface unit and said system bus, said bus interface unit including a bi-directional buffer circuit wherein read or write data transferred between said system bus and said input/output bus over said bus interface unit during said memory read or memory write cycle is temporarily stored during the transfer; and
   error detection and storage logic in said bus interface unit for (i) detecting occurrences of parity errors occurring in said temporarily stored data; (ii) identifying and storing in a storage device the address of a first of said parity errors detected during said individual memory read or memory write cycles; and (iii) generating an error signal on said system bus to indicate the occurrence of a parity error.

2. The computer system as defined in claim 1, further comprising a central arbitration control point residing on said system bus for serially performing (i) arbitration cycles wherein said central arbitration control point arbitrates, between input/output devices having requests pending for access to said input/output bus, to determine which of said input/output devices should be granted control of said input/output bus and (ii) grant cycles wherein said central arbitration control point grants control of said input/output bus and extends control of said system bus to one of said input/output devices; and
   wherein said error detection and storage logic detects occurrences of parity errors and generates said error signal on said system bus only during said grant cycles.

3. The computer system as defined in claim 1, further comprising circuitry for generating an error check signal on said input/output bus responsive to the detection of a parity error.

4. The computer system as defined in claim 1, wherein said bus interface unit butter circuit comprises a dual ported, asynchronous storage unit, in which is temporarily stored all data transferred during input/output device initiated memory read cycles and memory write cycles.

5. The computer system as defines in claim 4, wherein said asynchronous storage unit comprises four sixteen-byte buffers.

6. The computer system as defined in claim 1, further characterized by a latch for latching an address stored in said storage device until said address has been written out thereof.

7. The computer system as defined in claim 6, wherein said central processing unit is responsive to said generation of said error signal on said system bus to read said latched address in said storage device.

8. A method of detecting and storing parity errors in a dual-bus computer system comprising (i) system memory and a central processing unit electrically interconnected by a system bus; and (ii) a bus interface unit electrically interconnecting said system bus to an input/output bus, said method comprising the steps of:
   initiating with an input/output device connected to said input/output bus an individual memory read cycle from system memory or a memory write cycle to system memory;
   temporarily storing in a bi-directional buffer circuit in said bus interface unit read or write data transferred between said system bus and said input/output bus over said bus interface unit during said memory read cycle or memory write cycle;
   detecting occurrences of parity errors occurring in said temporarily stored data;
   identifying and storing in a storage device the address of a first of said parity errors detected during said individual memory read or memory write cycle; and
   generating an error signal on said system bus to indicate the occurrence of a parity error.

9. The method as defined in claim 8, wherein said buffer circuit comprises a dual ported, asynchronous storage unit, in which is temporarily stored all data transferred during input/output device initiated memory read cycles and memory write cycles.

10. The method as defined in claim 8, wherein said dual-bus computer system further comprises a latch for latching an address stored in said storage device until said address has been written out thereof.

11. The method as defined in claim 10, wherein said central processing unit responds to said generation of said error signal on said system bus to read said latched address in said storage device.

12. The method as defined in claim 8, further comprising the step of generating an error check signal on said input/output bus responsive to the detection of a parity error.

* * * * *